US008640219B2

(12) United States Patent
Zhang et al.

(10) Patent No.: US 8,640,219 B2
(45) Date of Patent: Jan. 28, 2014

(54) DIGITAL RIGHTS MANAGEMENT (DRM) ENABLED PORTABLE PLAYBACK DEVICE, METHOD AND SYSTEM

(75) Inventors: Junbiao Zhang, Beijing (CN); Kumar Ramaswamy, Princeton, NJ (US); Jeffrey Allen Cooper, Rocky Hill, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 960 days.

(21) Appl. No.: 11/922,442

(22) PCT Filed: Jun. 23, 2005

(86) PCT No.: PCT/US2005/022205
§ 371 (c)(1),
(2), (4) Date: Dec. 18, 2007

(87) PCT Pub. No.: WO2007/001285
PCT Pub. Date: Jan. 4, 2007

(65) Prior Publication Data
US 2009/0113536 A1 Apr. 30, 2009

(51) Int. Cl.
*G06F 15/16* (2006.01)
*H04L 29/06* (2006.01)

(52) U.S. Cl.
USPC .............. 726/12; 726/1; 726/2; 726/3; 726/4; 726/6; 726/26; 726/28; 726/29; 713/151; 713/152; 713/155; 713/161

(58) Field of Classification Search
USPC .............. 726/12, 26, 27; 705/51–59; 713/152
See application file for complete search history.

(56) References Cited

U.S. PATENT DOCUMENTS 2,471,909 A 5/1949 Spruance 5,790,664 A * 8/1998 Coley et al. ............... 709/203
(Continued)

FOREIGN PATENT DOCUMENTS

| CA | 2471909 | 7/2003 |
| DE | 10318489 | 11/2004 |

(Continued)

OTHER PUBLICATIONS

Chang et al., "Multimedia Rights Management for the Multiple Devices of End-User", Samsung Electronics, Proceedings of the 23rd International Conference on Distributed Computing Systems Workshops (ICDCSW'03), 0-7695-1921-0/03, 2003 IEEE.

(Continued)

*Primary Examiner* — Kambiz Zand
*Assistant Examiner* — Jenise Jackson
(74) *Attorney, Agent, or Firm* — Robert D. Shedd; Paul P. Kiel

(57) ABSTRACT

A method for enabling access to digital rights managed (DRM) content from a server to a portable playback device using a device that functions as a proxy for enabling communication between the server and the portable playback device. The method provides for establishing a connection with a device capable of operating as a gateway device for passing data between the portable playback device and the server, requesting that the device establish a connection with the server and operate as a proxy for enabling data exchange between the portable playback device and the server, sending to the server, upon establishing the connection with the server via the device operating as a proxy, data indicating DRM solutions supported by the portable playback device, and a list comprising requested DRM content to be downloaded to the portable playback device, and receiving from the server, via the device operating as a proxy, the requested DRM content and DRM rules associated with the received content.

15 Claims, 2 Drawing Sheets

(56) References Cited

U.S. PATENT DOCUMENTS

| | | | |
|---|---|---|---|
| 5,915,087 A * | 6/1999 | Hammond et al. | 726/12 |
| 6,473,406 B1 * | 10/2002 | Coile et al. | 370/248 |
| 6,697,944 B1 | 2/2004 | Jones et al. | |
| 6,894,981 B1 * | 5/2005 | Coile et al. | 370/248 |
| 6,963,972 B1 * | 11/2005 | Chang et al. | 713/153 |
| 7,136,359 B1 * | 11/2006 | Coile et al. | 370/248 |
| 7,171,662 B1 * | 1/2007 | Misra et al. | 717/177 |
| 7,359,883 B2 * | 4/2008 | Namba et al. | 705/59 |
| 7,382,879 B1 * | 6/2008 | Miller | 380/201 |
| 7,457,610 B2 * | 11/2008 | Takae et al. | 455/406 |
| 7,509,685 B2 * | 3/2009 | Lambert | 726/27 |
| 7,739,301 B2 * | 6/2010 | Bojinov et al. | 707/782 |
| 2001/0005890 A1 * | 6/2001 | Nitaki | 713/202 |
| 2001/0011253 A1 * | 8/2001 | Coley et al. | 705/59 |
| 2003/0037006 A1 * | 2/2003 | Maruyama et al. | 705/59 |
| 2003/0061115 A1 | 3/2003 | Wachi | |
| 2003/0236978 A1 | 12/2003 | Evans et al. | |
| 2004/0001594 A1 | 1/2004 | Krishnaswamy et al. | |
| 2004/0009777 A1 | 1/2004 | Koskimies et al. | |
| 2004/0143736 A1 | 7/2004 | Cross et al. | |
| 2004/0148408 A1 * | 7/2004 | Nadarajah | 709/229 |
| 2004/0148523 A1 * | 7/2004 | Lambert | 713/201 |
| 2004/0158712 A1 | 8/2004 | Lee et al. | |
| 2004/0168056 A1 | 8/2004 | Dillaway et al. | |
| 2004/0218609 A1 * | 11/2004 | Foster et al. | 370/401 |
| 2004/0249943 A1 | 12/2004 | Punaganti Venkata et al. | |
| 2004/0267965 A1 * | 12/2004 | Vasudevan et al. | 709/250 |
| 2005/0022033 A1 * | 1/2005 | Han | 713/201 |
| 2006/0174110 A1 * | 8/2006 | Strom et al. | 713/165 |
| 2006/0235802 A1 * | 10/2006 | Cappio et al. | 705/59 |
| 2007/0276760 A1 * | 11/2007 | Kanehara et al. | 705/59 |
| 2008/0216177 A1 * | 9/2008 | Yokosato et al. | 726/26 |
| 2009/0313471 A1 * | 12/2009 | Bjorkengren et al. | 713/170 |

FOREIGN PATENT DOCUMENTS

| | | | | |
|---|---|---|---|---|
| EP | 1460509 | | 9/2004 | |
| GB | 2018368 | | 11/1978 | |
| JP | 2003-99037 | | 4/2003 | |
| JP | 2004-537774 | | 12/2004 | |
| WO | WO 02/084445 A2 | | 10/2002 | |
| WO | WO03058620 | | 7/2003 | |
| WO | WO2004100010 | | 11/2004 | |
| WO | WO 2006/092840 | * | 9/2006 | G06F 15/00 |

OTHER PUBLICATIONS

International Search Report, dated Mar. 1, 2006.

* cited by examiner

DIGITAL RIGHTS MANAGEMENT (DRM) ENABLED PORTABLE PLAYBACK DEVICE, METHOD AND SYSTEM

This application claims the benefit, under 35 U.S.C. §365 of International Application PCT/US2005/022205 filed Jun. 23, 2005, which was published in accordance with PCT Article 21(2) on Jan. 4, 2007 in English.

TECHNICAL FIELD

The present invention relates generally to digital rights management (DRM) and portable content playback devices.

BACKGROUND OF THE INVENTION

Portable content playback devices such as the Sony Walkman, portable DVD players and Apple iPod have achieved considerable market success. While such devices may have conventionally provided only for audio playback, portable playback devices that support higher value content are desirable and believed to be commercially viable.

Digital Rights Management (DRM) systems have also been growing in importance and desirability, particularly for high value content distribution such as video, production movies and the like. As more portable content playback devices are developed to record and playback higher value content, it is believed that comprehensive DRM solutions for these devices will become highly desirable.

BRIEF SUMMARY OF THE INVENTION

A method and apparatus for enabling access to digital rights managed (DRM) content from at least one server to a portable playback device using a device that functions as a proxy for enabling communications between the server and the portable playback device. In one embodiment, the device is a PC coupled to the portable playback device through a USB, IEEE 1394, or other suitable interface, and to the server via the Internet. The invention provides for establishing a connection with a device capable of operating as a gateway device for passing data between the portable playback device and the server; requesting that the device establish a connection with the server and operate as a proxy for enabling data exchange between the portable playback device and the server; sending to the server, upon establishing the connection with the server via the device operating as a proxy, data indicating DRM solutions supported by the portable playback device, and a list comprising requested DRM content to be downloaded to the portable playback device; receiving from the server, via the device operating as a proxy, the requested DRM content and DRM rules associated with the received content; and playing back the received DRM content in accordance with the received DRM rules.

The proxy device may operate to provide substantially real time communications between the server and the portable playback device, or may operate in a store and forward mode in which the proxy device stores the DRM content from the server and downloads the stored data to the portable playback device during a subsequent session.

BRIEF DESCRIPTION OF THE DRAWINGS

Understanding of the present invention will be facilitated by consideration of the following detailed description of the preferred embodiments taken in conjunction with the accompanying drawings, wherein like numerals refer to like parts and.

DETAILED DESCRIPTION OF THE PREFERRED EMBODIMENTS

Figure 1:
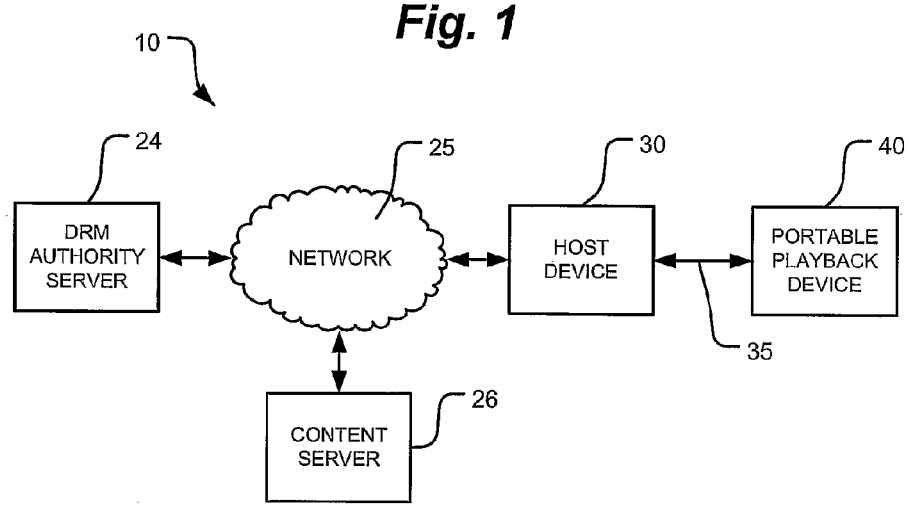
FIG. 1 illustrates a block-diagrammatic representation of a system according to an aspect of the present invention.

It is to be understood that the figures and descriptions of the present invention have been simplified to illustrate elements that are relevant for a clear understanding of the present invention, while eliminating, for purposes of clarity, many other elements found in typical DRM and portable content playback systems and methods of making and using the same. Those of ordinary skill in the art will recognize that other elements are desirable and/or required in order to implement the present invention. However, because such elements are well known in the art, a detailed discussion of such elements is not provided herein.

According to an aspect of the present invention, a DRM system and method suited for portable content playback devices is provided. The DRM system generally protects content by enabling secure distribution and/or disabling illegal distribution of the corresponding content data using various DRM rules and associated embedded data, and/or marking the content with a digital watermark.

Portable playback device connectivity is provided via a data transfer network. "Data transfer network", as used herein, generally refers to a group of two or more data operative devices linked together via a communications medium, such as wired (e.g., Ethernet, Universal Serial Bus (USB), IEEE1394 compliant (firewire)) or wireless (e.g., 802.11x compliant) communications links. Non-limiting examples of data transfer networks include wired and wireless Local Area Networks (LANs), Wide Area Networks (WANs) and data operative devices being linked together with a USB connection. "Data operative device", as used herein, generally refers to a device that either directly or indirectly, receives and/or provides data to/from a data transfer network, such as data that has traversed a part of the global interconnection of data transfer networks and data operative devices commonly referred to as the Internet.

"Server", as used herein, generally refers to a computing device that manages network resources. For example, a file server is a computing and storage device dedicated to storing files, while a database server processes database queries. Servers may, or may not, be dedicated and/or distributed. A single computing device can execute several servers at once, where a server is understood to take the form of a program, e.g., computer executable code, that is managing network resources.

According to an aspect of the present invention, and by way of example, a DRM system and method for a portable content playback device communicatively coupled to a DRM authority via a host device such as a personal computer (PC) is provided. The host provides for communications and content delivery for the portable playback device. The host assists in establishing end-to-end connectivity between the portable playback device and one or more of DRM authority and content servers. Such a host may make content acquisition and rights management for a portable playback device more convenient from a user's perspective.

Referring now to FIG. 1, there is shown a block diagrammatic view of a system 10 according to an aspect of the present invention. The illustrated system 10 includes a portable playback device 40 communicatively coupled to a host 30 via a communications medium 35 such as a USB interface. Host 30 is, in-turn, coupled to a data transfer network 25 communicatively coupled to DRM authority server(s) 24 and content server(s) 26. Connection 35 and network 25 enable portable device 40 to communicate and operate in conjunction with host 30 and servers 24, 26.

According to an aspect of the present invention, the portable device may itself support a DRM solution (or multiple DRM solutions) compatible with the DRM functionality of the servers 24, 26. In one non-limiting configuration, the DRM solution integrated into the portable playback device is relatively simplified as compared to existing DRM solutions adapted for use on personal computers (PCs), for example. For example, such a portable device DRM engine (e.g., computer executable code) may not support complicated time-based rules that are supported by the DRM engine associated with server(s) 24. To simplify a conventional PC-based DRM solution and enhance compatibility with portable content playback devices, DRM server(s) 24 may be precluded from sending any such complicated rules to the portable devices for processing.

Figure 2:
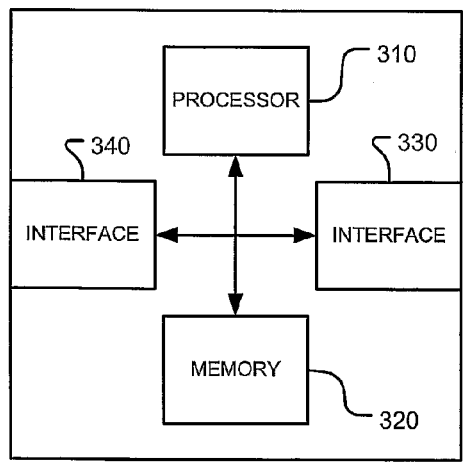
FIG. 2 illustrates a block-diagrammatic representation of a device suitable for use as a host of FIG. 1.

Referring now also to FIG. 2, there is shown a block diagrammatic view of a device 300 suitable for use as a host 30 of FIG. 1. Device 300 generally includes a processor 310, memory 320 and interfaces 330, 340.

Processor 310 generally takes the form of hardware, software, and/or a combination of hardware and software that controls operation of system 300. "Processor", as used herein, refers generally to a computing device including a Central Processing Unit (CPU), such as a microprocessor. A CPU generally includes an arithmetic logic unit (ALU), which performs arithmetic and logical operations, and a control unit. The control unit extracts instructions (e.g., processor executable code) from memory and decodes and executes these instructions, calling on the ALU when necessary. Of course, other elements may be used, such as an electronic interface or Application Specific Integrated Circuit (ASIC), for example.

"Memory", as used herein, generally refers to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of non-limiting example only. The memory utilized by the processor may be internal or external to an integrated unit including the processor. For example, in the case of a microprocessor, the memory may be internal or external to the microprocessor itself.

Interface 330 takes the form of an interface well suited for being communicatively coupled to portable playback device 40. For example, interface 330 may take the form of Universal Serial Bus (USB) interface. Of course, other suitable interfaces, such as an IEEE 1394 compliant interface may be used. As is understood by one skilled in the pertinent arts, an IEEE 1394 compliant external bus supports data transfer rates of up to 400 Mbps (in 1394a) and 800 Mbps (in 1394b).

Interface 340 is, in-turn, well suited for communicating with servers 24, 26 via network 25. For example, interface 340 may take the form of a modulator/demodulator (modem) for communicating via a public switched telephone network (PSTN). Alternatively, interface 340 may take the form of suitable hardware and/or software for communicating with a broadband gateway device, such as a DSL or cable modem—in turn coupled to the global interconnection of computers and computer networks commonly referred to as the Internet. In one non-limiting configuration, interface 340 may take the form of an Ethernet interface.

According to an aspect of the present invention, device 300 takes the form of a multi-functional personal computer (PC) including an Intel Pentium-type processor, several hundred megabytes (MB) of memory, a USB interface and an Ethernet interface, or a dedicated appliance that includes the herein-described functionality. Generally, "appliances" are data operative devices with more limited memory, disk storage and processor power designed to connect to a data transfer network, such as the Internet.

Figure 3:
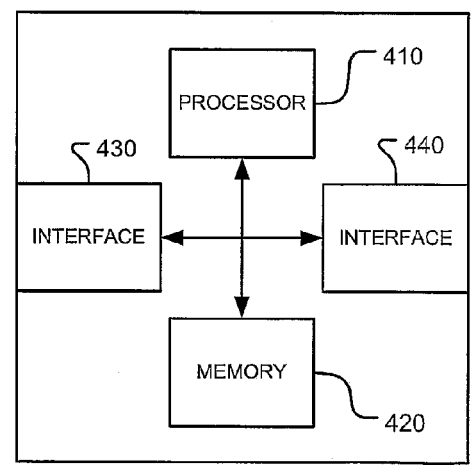
FIG. 3 illustrates a block-diagrammatic representation of a device suitable for use as a portable playback device of FIG. 1.

Referring now also to FIG. 3, there is shown a block diagrammatic view of a device 400. Device 400 is well suited for use as a portable playback device 40 of FIG. 1. Device 400 generally includes a processor 410, memory 420 and interfaces 430, 440.

Processor 410 generally takes the form of hardware, software, or a combination thereof that controls operation of device 400. Memory 420 again takes the form of one or more devices capable of storing data, such as processor executable code and content data. Interface 430 takes the form of an interface well suited for being communicatively coupled to host 30, such as a USB or IEEE 1394 compliant interface.

Interface 440 is well suited for providing play-out and user interface functionality. For example, interface 440 may provide for video and/or audio output signals. Such output signals may be sent to integrated or external play-out device(s), such as speakers and/or displays. For example, interface 440 may include component type ports (e.g., video, audio left and audio right ports). Other ports for providing video and/or audio playback dependently upon processor 410 processing data stored in memory 420 may be provided though, such as one or more High Density Multi-media Interface (HDMI) ports. Interface 440 further includes a user interface, such as a graphical user interface (GUI) and one or more user input devices (such as buttons) to facilitate user content selection and general device operation. The GUI is generated and displayed on an internal display responsive to processor 410 executing code stored in memory 420, for example.

Figure 4:
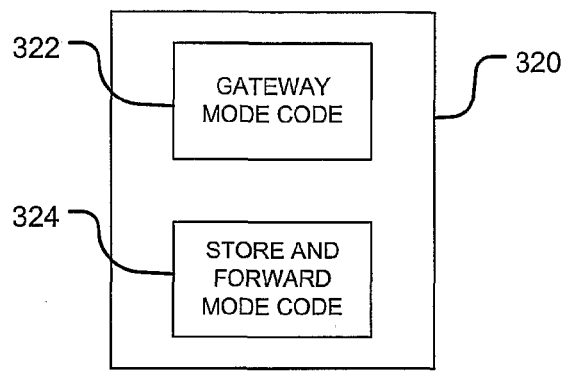
FIG. 4 illustrates a block diagrammatic view of a host memory according to an aspect of the present invention; and, FIG. 5 illustrates a block diagrammatic view of a portable playback device memory according to an aspect of the present invention.

Referring now also to FIG. 4, there is shown a block diagrammatic view of memory 320 of device 300 being configurable as host 30. Memory 320 includes processor executable code 322 for causing host 30 to operate in a first gateway mode in response to execution by processor 310 (FIG. 2). As may be seen in FIG. 4, memory 320 also includes processor executable code 324 for causing host 30 to operate in a second, store-and-forward mode responsively to execution thereof by processor 310 (FIG. 2). Of course, memory 320 may store other data, such as code and data useful for operating host 30 and communicating via interfaces 330, 340, for example.

According to an aspect of the present invention, host 30 functions in the first mode as a communication exchange conduit between servers 24, 26 and portable device 40. In this mode, host 30 does not interpret information in the exchange. For example, in the first mode, host 30 does not interpret DRM rules passed from the DRM server to the portable device. Instead, host 30 operates only as a conduit or gateway for passing information between portable playback device 10 and content servers 24, 26. As will be understood by those possessing an ordinary skill in the pertinent arts, some measure-able amount of delay may be introduced by network transmission and processing constraints between the occurrence of an event (e.g., an action being taken at either a server or playback device) and the use of corresponding data (i.e., a message being received or a corresponding action being taken at another of the server and playback device). Accordingly, such a first mode may provide end-to-end connectivity between a device 10 and server(s) 24, 26 in substantially- or near-real-time.

It is understood that various mechanisms exist for implementing such a gateway mode. For example, in the first mode, a host 30 may operate as an Internet Protocol (IP) router. "Router" as used herein generally refers to a device that forwards packets between data transfer network segments. Alternatively, where Hyper Text Transfer Protocol Secure sockets (HTTPS) are used as a communication protocol between DRM server 24 and portable device 40, host 30 may serve as an HTTPS proxy. "Proxy", as used herein generally refers to computing device, such as a PC or router being communicatively interposed between a client application and a server. A proxy generally intercepts communications between the application and server, determines if it can fulfill the requests itself, and forwards the requests to the intended recipient. Thus, an end-to-end protocol is employed in the first, or gateway mode, such that host 30 blindly forwards or passes data (including DRM data and content data) between the servers 24, 26 and one or more client applications being executed by portable playback device 40 using processor 310 and memory 320. This protocol may, or may not, be a secure protocol. Application(s) being executed by portable playback device 40 acquire content and permissions, and to selectively permit content data play-back, deletion, copying and the like dependently upon the acquired permissions.

Such an approach may result in several advantages. For example, host 30 may enhance the user inter-operability of portable device 40 by providing a readily available and convenient communications interface. Further, as host 30 merely services as a pass-through device for content (including e.g. licenses and DRM management), content provider(s) 26 may have enhanced confidence in the security of the provided DRM solution. Still further the present functional configuration does not require one to establish or maintain a secure relationship between host 30 and portable device 40. This eliminates the need for secret keys to be installed on the portable device at the manufacturing site. Such configuration advantageously reduces complexity as well as security risks.

In an exemplary configuration, the content server may be configured to store and index digital content, with the DRM server having a plurality of data and algorithms to be associated with a particular set of digital content and embedded rights information (digital content package), and associated licensing information. If a desired access is included with the license information, the digital rights management system debits the license package for the desired access and permits the access.

According to another aspect of the present invention, host 30 operates in a second mode of operation (responsive to execution of code 324 by processor 310), to provide store-and-forward capabilities associated with transmission and processing of high value content in a non-real time manner. This second mode of operation is suitable for transferring encrypted content (including encrypted licenses) from a server in a non-real time manner to the portable device, for example.

Where content is encrypted, there is little risk in temporarily storing the encrypted content on host 30, since the DRM solution relies upon the encryption strength to provide for content protection. In the second mode of operation, host 30 serves as a temporary end-point for transferring content (and licenses) from the DRM and/or content server(s) 24, 26 and storage. After transfer to host 30, the stored or queued rules and/or content data are forwarded to the portable device 40 in a separate session. In the second mode, host 30 thus operates as an application layer proxy. In this manner, host device 30 operates to "spoof" the DRM and/or content server at the application level to transfer encrypted content to the host device 30. Such encrypted content may be in response to a previous user request for content (e.g. a user request to obtain the latest movie release) or may be in response to automatic or periodic content downloads from the DRM server or content provider (e.g. a rules update or movie trailer). Because portable device 40 need not be connected to the host at the time the content and/or license data is transferred from a server 24, 26, such a content acquisition process provides enhanced flexibility.

In similar fashion, the portable device, upon coupling to the host device, requests download of all available content data since its last synchronization with the content server and/or DRM server. Alternatively, downloaded data may be pushed to a portable device. Regardless of whether the host is physically connected to either of servers 24, 26, host device 30 operates in the application proxy mode to respond to a request from device 40, retrieve from its memory location the encrypted content previously obtained from the servers, and forward the content to device 40.

The following scenario is an exemplary illustration of system operations according to an aspect of the present invention. For example, a home PC host 30 connected to a cable modem (via interface 340) downloads video content data and corresponding license data from content server(s) 26 during a given time period (e.g. during the day) using an application being stored in memory 320 and executed by processor 310. This download occurs without requiring the portable playback device to be connected to the host, as the host device is operating in the application layer proxy mode to receive and store the encrypted content. During that time, the portable device 40 may be employed (e.g. at work) for performing other operations, such as play-back of previously acquired audio/video content (stored in memory on device 40) associated with a previously acquired license, for example. At a later time, the user can synchronize or download the new content and associated license data from the host PC 30 to device 40. This is accomplished by coupling interface 430 of portable device 40 to interface 330 of host 30, and transferring the newly acquired license and content data from host memory 320 to device memory 420 via communication medium 35. The user may then use the device to view the transferred video content. This may be accomplished, for example, by de-coupling interfaces 430, 330 and coupling interface 440 to a conventional display device using for example, an IEEE 1394 compliant or HDMI connection.

The above operations enable a user of the playback device to reduce idle time associated with the end-to-end downloading of content over a networked system. In particular, since content download typically occurs over a networked system such as the Internet, a user of the portable playback device would otherwise typically have to wait while the content is delivered over the Internet to the playback device. Instead, according to the present invention, the user is required to wait only the relatively short time it takes to download the content from the host device to the playback device, which transfer occurs over interface connection 35, which may take the form of a high-speed interface (the download over the internet to host 30 having occurred previously while the playback device was not connected).

While the second, store-and-forward mode may provide significant flexibility, it may not be suitable for all DRM management tasks. Certain DRM management operations may require the DRM server to briefly communicate with the portable device directly or in real time. For example, the DRM server 24 may need to individualize the portable playback device 40 at the time the DRM engine is installed on the portable device. Other cases may also exist that require establishing direct or end-to-end connection between the serve(s) and the portable playback device, including establishing the trust relationship between the server(s) and the playback device. In such cases, the host operates in the first mode as a gateway device that enables a direct, end-to-end communication channel between the portable device 40 and the DRM server 24 (or content server 26).

Transfer between operational modes may be accomplished in various ways, including for example, via user selection, automatically based on message headers or formats, asynchronously according to the data to be transferred, or one or more combinations thereof.

Further yet, because of the simple role of host 30 in both the first and second modes of operation, a portable playback device 40 can use a wide variety of data operative devices that provide support for synchronizing data as a host 30. For example, a device capable of storing code 322, 324, acting as a gateway device, acquiring content and license data via an interface and transferring the acquired content and license data to device 40 may be suitable for use. Code 324 may use time stamps and user preferences in a synchronization process to track data changes on one or both of host 30 and portable device 40. The application may then transfer the necessary data to the other device so that updates are propagated to that device. By way of example only, ActiveSync software, available from Microsoft Corporation as part of its Windows CE operating system, provides such functionality and may be well suited to assist device 40 in acquiring and transferring content and DRM permissions to a portable playback device.

The device 10 is connected to host 30, device 10 may request that the host 30 establish connections with a server of the desired content provider using one of the first, the gateway, or second, the store and forward, modes of operation. Once the connection with the server has been established, the device 10 transmits the request for the DRM content along with the listing of DRM solutions supported by the device. The server uses the listing to determine whether the requested DRM content can be transmitted to the device. Once the request is approved, the server transmits the DRM content to the device using the host as a proxy wherein the host does not interpret the transferred data.

Figure 5:
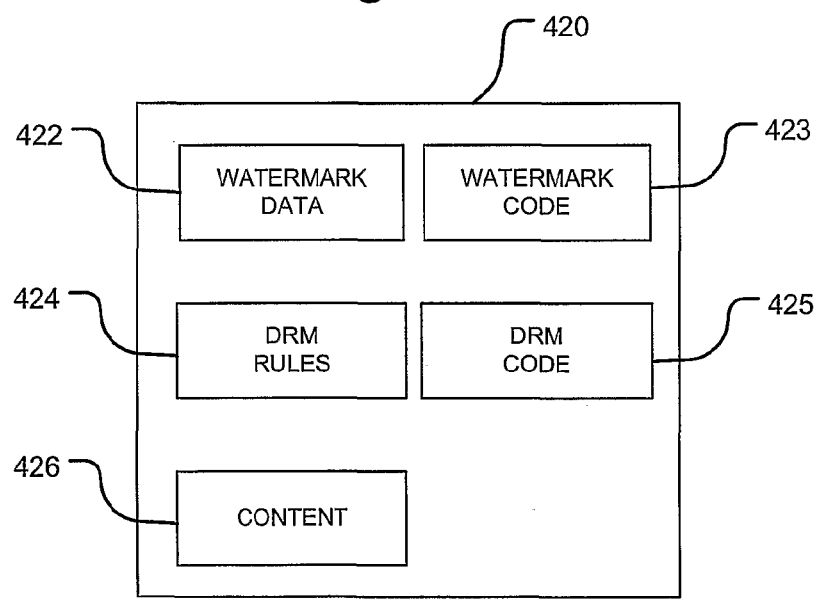

Referring now also to FIG. 5, there is shown a block diagrammatic view of memory 420 of device 400 (FIG. 3) being suitable for use as portable playback device 40 (FIG. 1). As may be seen in FIG. 5, memory 420 includes DRM rules 424 acquired from at least one of servers 24, 26, and DRM code 425 being executable by processor 410 to enforce the stored DRM rules 424. Memory 420 also includes content data 426 acquired from content server(s) 26, suitable for processing by processor 410 (FIG. 3) to provide an audio and/or visual play-out via interface 440 (FIG. 3).

Memory 420 further includes watermark data 422 and watermark code 423 executable by processor 410 to digitally watermark at least a part of content 426. "Watermark", as used herein, generally refers to a digital watermark, or a data pattern inserted into content data, such as data representative of a digital image, audio or video file, that identifies certain information. The watermark may identify information such as information indicative of the content, the content provider, copyright holder and/or some information at least substantially unique to the portable playback device 40 and/or host 30. Of course, memory 420 may store other data, such as code and data useful for operating playback device 40. Such operations include presenting the GUI on an internal display, detecting user activation of buttons, and communicating data via interface 430 (FIG. 3) for example.

Watermark data 422 may be provided to or otherwise developed by the portable playback device 40 upon initialization or registration of the device 40 with a DRM authority server 24 and/or content server 26, using the gateway mode of operation of host 30. In one non-limiting embodiment, watermark data 422 is substantially unique to a particular portable playback device 40. For example, device 40 and authority server 24 securely negotiate (through the use of public/private key cryptographic techniques, for example) a substantially random number to be associated with device 40 to establish a trust-relationship between the server(s) 24, 26 and device 40. This number is used by processor 410 (FIG. 3) in executing code 425 to watermark content data 426. DRM rules 424 specify when content data 426 is to be watermarked by processor 410 using watermark data 422 and code 423. For example, content data 426 may be watermarked with data 422 by processor 410 executing code 423 upon receipt thereof. Alternatively, content data 426 may be watermarked with data 422 by processor 410 executing code 423 upon playback. In yet another configuration, content data 426 may be watermarked with data 422 by processor 410 executing code 423 upon attempted transfer thereof via interface 430. Host device 30 may optionally include analogous code and/or rules in memory that may operate in like fashion.

It is understood that various digital watermarking solutions may be implemented as is well known in the art, according to the requirements of the particular application. The digital watermarking solution may include protection from content alteration, compression, format change, cropping, etc. Information such as user or source ID, date and time information may be used as robust digital watermarks.

The present invention advantageously allows a content provider to examine unauthorized copies or uses of copyrighted content for watermarks. Upon detecting a watermark in an unauthorized copy, the content provider can forensically determine what devices (e.g. host 30 or portable device 40) have accessed, processed or copied the content.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

The invention claimed is:

1. A method for accessing digital rights managed (DRM) content from a server using a portable playback device, the method comprising the steps of:

establishing a connection with a multifunction computing device capable of operating as a gateway device for passing data between the portable playback device and the server;

requesting that the multifunction computing device establish a connection with the server and operate as a proxy for operating as a pass through device for enabling direct end to end data exchange, without interpreting the data, between the portable playback device and the server, wherein the multifunction computing device operates as a proxy without maintaining a secure relationship with the portable playback device;

sending to the server, upon establishing the connection with the server via the multifunction computing device operating as a proxy, a listing of the DRM solutions supported by the portable playback device, and a list comprising requested DRM content to be downloaded to the portable playback device;

receiving from the server, via the multifunction computing device operating as a proxy, the requested DRM content and DRM rules associated with the received content; and playing back the received DRM content in accordance with the received DRM rules.

2. The method according to claim 1, wherein the requesting step comprises requesting that the multifunction computing device operate in one of two proxy modes, including a first mode in which the multifunction computing device establishes an end to end communications link between the server and the portable playback device for passing data between the server and the portable playback device in substantially real time, and a second mode in which the multifunction computing device operates as an application layer proxy in which the multifunction computing device receives and stores the DRM content, and transfers the DRM content to the portable playback device during a subsequent session.

3. The method according to claim 2, wherein during the second mode, the multifunction computing device operates as an IP router.

4. The method according to claim 2, wherein the portable playback device selects the first proxy mode in response to initialization data received from the server.

5. The method according to claim 3, wherein the portable playback device may select either one of the first or second proxy modes in response to completion of a DRM initialization phase using the initialization data received from the server.

6. The method according to claim 2, wherein the portable playback device transfers the DRM content from the multifunction computing device during a synchronizing operation between the playback device and the multifunction computing device.

7. The method according to claim 2, wherein the DRM content comprises one of audio, video and license data.

8. The method according to claim 2, wherein the multifunction computing device capable of operating as a gateway device comprises a PC.

9. A portable playback device for accessing digital rights managed (DRM) content from a server, comprising:

a communications interface for connecting to a multifunction computing device capable of operating as a gateway device for passing data between the portable playback device and the server;

a memory for storing DRM rules and downloaded DRM content; and a processor, coupled to the communications interface and the memory, operative to: transmit a request that the multifunction computing device establish a connection with the server and operate as a proxy for operating as a pass through device for enabling direct end to end data exchange between the portable playback device and the server without interpretation within the multifunction computing device, wherein the multifunction computing device operates as a proxy without maintaining a secure relationship with the portable playback device; transmit to the server, upon establishing the connection with the server via the multifunction computing device operating as a proxy, a listing of DRM solutions supported by the portable playback device, and a list of DRM content to be downloaded to the portable playback device; store the requested DRM content and DRM rules associated with the DRM content received from the server, via the multifunction computing device operating as a proxy; and play back the received DRM content in accordance with the received DRM rules.

10. The apparatus according to claim 9, wherein the processor is operative to request that the multifunction computing device operate in one of two proxy modes, including a first mode in which the multifunction computing device establishes an end to end communications link between the server and the portable playback device for passing data between the server and the portable playback device in substantially real time, and a second mode in which the multifunction computing device operates as an application layer proxy in which the multifunction computing device receives and stores the DRM content, and transfers the DRM content to the portable playback device during a subsequent session.

11. The apparatus according to claim 10, wherein during the second mode, the multifunction computing device operates as an IP router.

12. The apparatus according to claim 10, wherein the processor requests that the multifunction computing device operates in the first proxy mode in response to initialization data received from the server.

13. The apparatus according to claim 12, wherein the processor may select either one of the first or second proxy modes in response to completion of a DRM initialization phase using the initialization data received from the server.

14. The apparatus according to claim 12, wherein in processor transfers the DRM content from the multifunction computing device during a synchronizing operation between the playback device and the multifunction computing device.

15. The apparatus according to claim 10, wherein the DRM content comprises one of audio, video and license data.

* * * * *